United States Patent
Chirala et al.

(10) Patent No.: US 9,674,840 B1
(45) Date of Patent: Jun. 6, 2017

(54) SYSTEM AND METHODS FOR AVOIDING CALL PERFORMANCE DEGRADATION DUE TO MISSED DOWNLINK CONTROL SIGNAL IN A WIRELESS COMMUNICATION DEVICE

(71) Applicant: QUALCOMM Incorporated, San Diego, CA (US)

(72) Inventors: Ramesh Chandra Chirala, San Diego, CA (US); Sharif Matin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 14/978,271

(22) Filed: Dec. 22, 2015

Related U.S. Application Data

(60) Provisional application No. 62/259,953, filed on Nov. 25, 2015.

(51) Int. Cl.
| | |
|---|---|
| H04W 72/04 | (2009.01) |
| H04W 76/04 | (2009.01) |
| H04W 72/02 | (2009.01) |
| H04W 88/06 | (2009.01) |

(52) U.S. Cl.
CPC ....... *H04W 72/0453* (2013.01); *H04W 72/02* (2013.01); *H04W 76/045* (2013.01); *H04W 88/06* (2013.01)

(58) Field of Classification Search
CPC ........... H04W 72/0453; H04W 76/045; H04W 72/02; H04W 88/06
See application file for complete search history.

(56) References Cited

U.S. PATENT DOCUMENTS

| | | |
|---|---|---|
| 8,897,234 B2 | 11/2014 | Ma et al. |
| 8,989,107 B2 | 3/2015 | Sambhwani et al. |
| 9,438,291 B2* | 9/2016 | Inampudi ............. H04W 48/16 |

(Continued)

FOREIGN PATENT DOCUMENTS

| | | |
|---|---|---|
| WO | 2015050889 A1 | 4/2015 |
| WO | 2015051157 A1 | 4/2015 |

OTHER PUBLICATIONS

International Search Report and Written Opinion—PCT/US2016/058765—ISA/EPO—Feb. 15, 2017.

*Primary Examiner* — Brandon Miller
(74) *Attorney, Agent, or Firm* — Changwoo Yang

(57) ABSTRACT

Methods and devices for improving performance on a wireless communication device having at least a first subscriber identity module (SIM) and a radio frequency (RF) resource may include detecting, on a modem stack associated with the first SIM, an active communication in a first network that supports high speed downlink packet access (HSDPA). During the active communication in the first network, the wireless communication device may detect a signal disruption period, and determine whether an operational downlink mode for the modem stack associated with the first SIM does not match a corresponding downlink mode represented in the first network. Upon determining that the operational downlink mode for the modem stack associated with the first SIM does not match the corresponding downlink mode represented in the first network, the wireless communication device may trigger an internal instruction to transition to a new downlink mode.

30 Claims, 8 Drawing Sheets

(56) References Cited

U.S. PATENT DOCUMENTS

| | | | |
|---|---|---|---|
| 9,544,042 B2 * | 1/2017 | Li | .......................... H04B 7/0871 |
| 2003/0017842 A1 | 1/2003 | Moles et al. | |
| 2010/0130219 A1 | 5/2010 | Cave et al. | |
| 2013/0194947 A1 | 8/2013 | Ehsan et al. | |
| 2013/0286853 A1 | 10/2013 | Shi et al. | |
| 2016/0345377 A1 * | 11/2016 | Lindoff | ................. H04W 88/06 |

* cited by examiner

SYSTEM AND METHODS FOR AVOIDING CALL PERFORMANCE DEGRADATION DUE TO MISSED DOWNLINK CONTROL SIGNAL IN A WIRELESS COMMUNICATION DEVICE

RELATED APPLICATIONS

This application claims the benefit of priority to U.S. Provisional Application No. 62/259,953 entitled "System and Methods for Avoiding Call Performance Degradation due to Missed Downlink Control Signal in a Wireless Communication Device" filed Nov. 25, 2015, the entire contents of which are hereby incorporated by reference.

BACKGROUND

Multi-subscriber identity module (SIM) wireless communication devices have become increasing popular because of their flexibility in service options and other features. One type of multi-SIM wireless communication device, a multi-SIM multi-standby (MSMS) device (e.g., a dual-SIM dual-standby (DSDS) device), enables two SIMs to be in idle mode waiting to begin communications, but only allows one SIM at a time to participate in an active communication due to sharing of a single radio frequency (RF) resource (e.g., a transceiver). Other multi-SIM devices may extend this capability to more than two SIMs and may be configured with any number of SIMs greater than two (i.e., multi-SIM multi-standby wireless communication devices).

Wireless communication networks (referred to simply as "wireless networks") are widely deployed to provide various communication services such as voice, packet data, broadcast, messaging, and so on. Wireless networks may be capable of supporting communication for multiple users by sharing the available network resources. Such sharing of available network resources may be implemented by networks using one or more multiple-access wireless communications protocols, such as Time Division Multiple Access (TDMA), Code Division Multiple Access (CDMA), Time Division Multiple Access (TDMA), and Frequency Division Multiple Access (FDMA). These wireless networks may also utilize various radio technologies, including but not limited to Global System for Mobile Communications (GSM), Universal Mobile Telecommunications System (UMTS), High Speed Packet Access (HSPA) is CDMA2000, Advanced Mobile Phone Service (AMPS), General Packet Radio Services (GPRS), Long Term Evolution (LTE), High Data Rate (HDR) technology (e.g., 1×EV technology), etc.

Since an MSMS wireless communication device typically uses a single RF resource to communicate over the multiple SIMs and/or networks, the device actively communicates using a single SIM and/or network at a given time. Therefore, during an active data communication on one SIM (e.g., the first SIM), the wireless communication device may periodically tune away to a network associated with another SIM (e.g., the second SIM) to monitor signals or acquire a connection. As a result, depending on the duration of the tune away, the wireless communication device may fail to receive control signals that are normally exchanged with the network supported by the first SIM, including messages indicating transitions between downlink modes. Such failure may cause a mismatch between the downlink mode of the wireless communication device and the corresponding downlink mode in the network. While this mismatch may be addressed by performing a cell update procedure, such procedure may involve an inefficient use of power and/or network resources, as well as degrade performance for the active communication.

SUMMARY

Methods and devices implementing methods of various embodiments may enable improving performance of a wireless communication device configured to use at least a first SIM associated with a radio frequency (RF) resource by detecting an active communication in a first network on a modem stack associated with the first SIM, detecting a signal disruption period during the active communication in the first network, determining whether an operational downlink mode for the modem stack does not match a corresponding downlink mode represented in the first network, and triggering an internal instruction to transition to a new downlink mode in response to determining that the operational downlink mode for the modem stack does not match a corresponding downlink mode represented in the first network. In some embodiments, the first network may support high speed downlink packet access (HSDPA).

In some embodiments, determining whether an operational downlink mode for the modem stack does not match a corresponding downlink mode represented in the first network may include determining whether a control signal for transitioning to a new downlink mode was missed on the modem stack SIM during the signal disruption period. In some embodiments, the control signal for transitioning to the new downlink mode may be an instruction to transition to a dual carrier mode by enabling a secondary carrier. In some embodiments, the control signal for transitioning to the new downlink mode may be an instruction to transition to a single carrier mode by disabling a secondary carrier.

In some embodiments, determining whether an operational downlink mode for the modem stack does not match a corresponding downlink mode represented in the first network may be based on an absence of expected downlink data from the first network. In some embodiments, the absence of the expected downlink data may be a lack of any downlink traffic protocol data units (PDUs) from the first network. In some embodiments, the absence of the expected downlink data may be an absence of a downlink acknowledgment/non-acknowledgment (ACK/NACK) protocol data unit (PDU) corresponding to a previous uplink data transmission to the first network.

In some embodiments, determining whether an operational downlink mode for the modem stack does not match a corresponding downlink mode represented in the first network may be based on at least one of detected transmission sequence number (TSN) holes in downlink data received from the first network, and disproportionate transport block size (TBS) in downlink data received from the first network compared to a channel quality indicator (CQI) reported to the first network.

Some embodiments may further include monitoring downlink data received on the modem stack after the transition to the new downlink mode, and transitioning back to the original downlink mode in response to a continued absence of the expected downlink data. In some embodiments, the first network may support high speed downlink packet access (HSDPA).

In some embodiments, the wireless communication device may have at least a second SIM associated with the RF resource, and detecting the signal disruption period during the active communication in the first network may include detecting a tune-away by the shared RF resource from the first network to a second network associated with the second SIM, in which the RF resource tunes back to the first network after the tune-away. In some embodiments, detecting the signal disruption period during the active communication in the first network may include detecting a temporary deep fade on a channel associated with connecting to the first network.

Various embodiments include a wireless communication device configured to use at least a first SIM associated with an RF resource, and including a processor configured with processor-executable instructions to perform operations of the methods described above. Various embodiments also include a non-transitory processor-readable medium on which is stored processor-executable instructions configured to cause a processor of a wireless communication device to perform operations of the methods described above. Various embodiments include a wireless communication device having means for performing functions of the methods described above.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
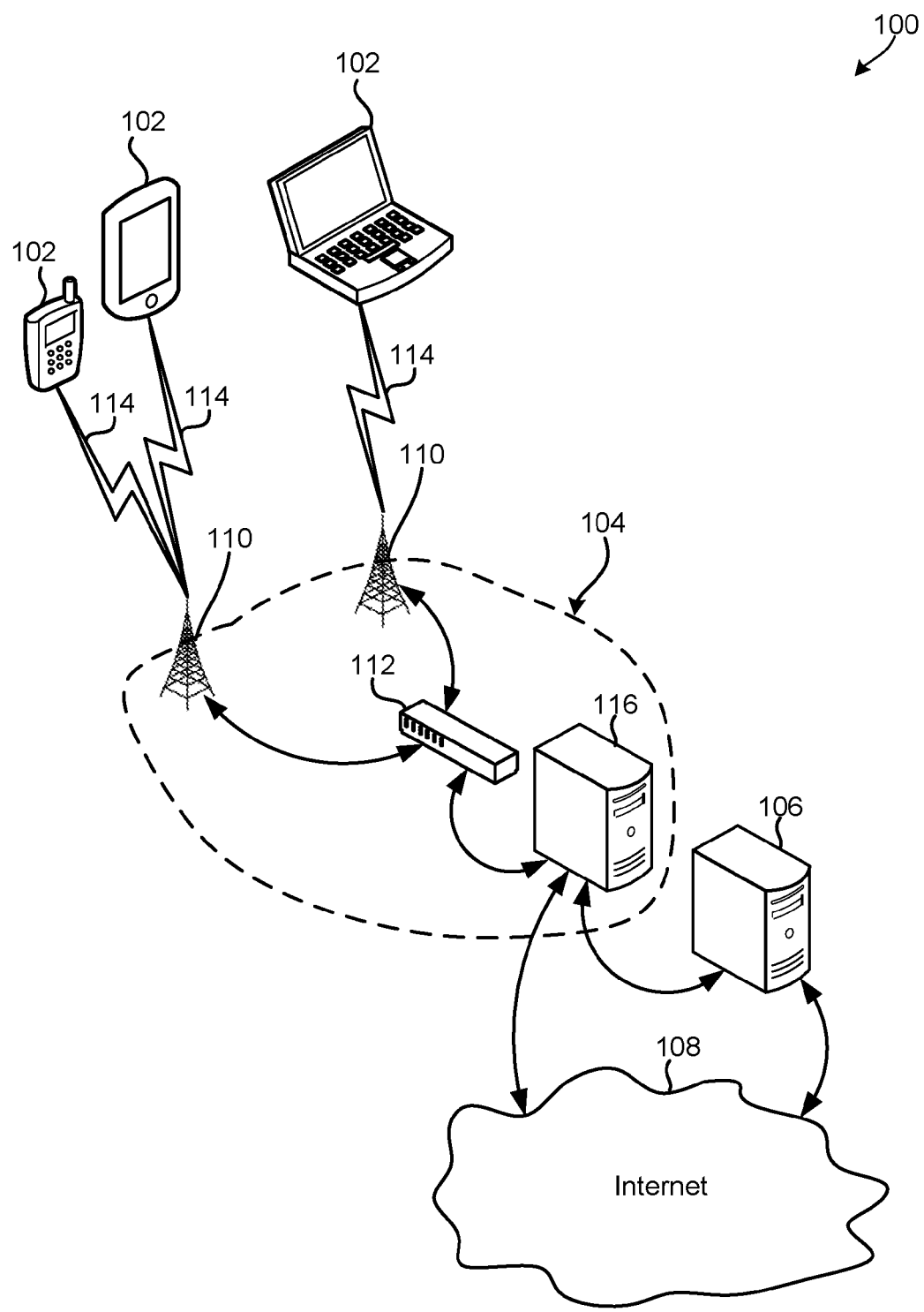
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

Various embodiments provide methods, systems, and devices improving performance on a wireless device configured to communicate on multiple SIMs using a shared RF resource. In particular, the various embodiments may avoid call performance degradation on a first SIM by identifying and correcting for missed downlink control signals during a tune-way to a network associated with the second SIM.

In some embodiments, at least one SIM of the MSMS wireless communication device may be associated with high speed packet access (HSPA), and may support multiple modes for high speed downlink packet access (HSDPA). Specifically, the at least one SIM may have dual cell (DC)-HSDPA capability, which enables switching between a (normal) single carrier mode using a primary cell, and a dual carrier mode that uses both a primary and secondary carrier for downlink data. In various HSPA systems, the network controls transitions between the single (normal) mode and dual carrier mode through enabling/disabling the secondary carrier, which is communicated to the MSMS device through orders on a high speed shared control channel (HS-SCCH). During a tune-away from an active communication on an HSPA SIM, control signaling from the network indicating a downlink mode transition may be missed. As a result of the mismatch, the network may stop scheduling downlink data for the wireless communication device, prompting a cell update on the HSPA SIM in order to recover synchronization.

Various embodiments enable a MSMS wireless communication device to perform efficient synchronization of downlink mode following a tune-away to another network. Such efficient synchronization may involve using existing signaling to determine whether an instruction from the network to enable or disable a secondary carrier was missed, and if so, to initiate a transition to a new downlink mode through internal signaling. Further, management of efficient synchronization in the various embodiments may involve monitoring signaling in the new downlink mode to either confirm synchronization, or prompt transitioning back to the original downlink mode for the HSPA SIM.

The terms "wireless device," "wireless communication device," "user equipment," and "mobile device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "subscription," "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. Examples of SIMs include the Universal Subscriber Identity Module (USIM) provided for in the LTE 3GPP standard, and the Removable User Identity Module (R-UIM) provided for in the 3GPP2 standard. Universal Integrated Circuit Card (UICC) is another term for SIM.

The terms subscription and SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM dual-standby device," and "DSDS device" are used interchangeably to describe a wireless device that is configured with more than one SIM and allows idle-mode operations to be performed on two networks simultaneously, as well as selective communication on one network while performing idle-mode operations on the other network.

As used herein, the terms "power-saving mode," "power-saving-mode cycle," "discontinuous reception," and "DRX cycle" are used interchangeably to refer to an idle-mode process that involves alternating sleep periods (during which power consumption is minimized) and awake (or "wake-up") periods (in which normal power consumption and reception are returned and the wireless device monitors a channel by normal reception). The length of a power-saving-mode cycle, measured as the interval between the start of a wake-up period and the start of the next wake-up period, is typically signaled by the network.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UNITS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless networks, a wireless communication device may have multiple subscriptions to one or more networks (e.g., by employing multiple subscriber identity module (SIM) cards or otherwise). Such a wireless device may include, but is not limited to, a dual-SIM dual-standby (DSDS) device. For example, a first subscription may be a first technology standard, such as Wideband Code Division Multiple Access (WCDMA), while a second subscription may support the same technology standard or a second technology standard, such as Global System for Mobile Communications (GSM) Enhanced Data rates for GSM Evolution (EDGE) (also referred to as GERAN).

A multi-SIM wireless device that supports two or more SIM cards may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-active dual standby" (DSDS) wireless device in which two SIMs are configured to share a single transceiver (i.e., RF resource).

High Speed Downlink Packet Access (HSDPA) and High Speed Uplink Packet Access (HSUPA) optimize UMTS for packet data services in downlink and uplink, respectively. Together, they are referred to as High Speed Packet Access (HSPA). Within 3GPP Release 7, 8, 9 and 10, further improvements to HSPA have been specified in the context of HSPA+ or HSPA evolution.

Typically, downlink data packets may be transmitted in the High-Speed Downlink Shared Channel (HS-DSCH), which uses a fixed frame size of two milliseconds. The data transmitted in a single frame is referred to as a transport block. Depending on the coding and modulation scheme employed, a transport block may include from as few as 137 bits to as many as 27,952 bits. While operating in DC-HSDPA mode, a wireless communication device (or modem stack associated with a SIM of the wireless communication device) receives HSDPA transmissions from two cells that transmit on separate, adjacent carriers with potentially different cell powers. In embodiments systems using DC-HSDPA, it may be assumed that the two cells/carriers are served by the same network. While the serving cell (also referred to as primary cell or primary carrier) has a full set of common channels, the wireless communication device typically must assume that the secondary cell (also referred to as secondary carrier) only transmits the common pilot channel (CPICH).

Both cells/carriers may transmit HS-PDSCH and HS-SCCH to the wireless communication device simultaneously, and each HS-PDSCH carries independent data. The wireless communication device typically determines the configuration of each cell/carrier HS-PDSCH by reading each cell's/carrier's HS-SCCH with independently assigned H-RNTI.

The wireless communication device may indicate whether it supports DC-HSDPA in the radio resource control (RRC) connection setup request message, and signals a DC-HSDPA category in a RRC connection setup complete message. A HSPA network enables and activates DC-HSDPA at call setup in a radio resource control (RRC) connection setup or radio bearer (RB) setup message. Once on a connection, DC-HSDPA may be enabled or disabled by all the reconfiguration messages (radio bearer reconfiguration (RBR), transport channel reconfiguration (TCR) and physical channel reconfiguration (PCR)), or by using RB Release or active set update message.

When DC-HSDPA is enabled, the secondary carrier may also be activated or deactivated using HS-SCCH orders that can be sent on either the primary or secondary carrier. The primary and secondary carriers may also be referred to as the serving cell and secondary cell, respectively.

In current HSPA systems, ACK/NACK feedback for HSDPA is transmitted by the wireless communication device on the High-Speed Dedicated Physical Control Channel (HS-DPCCH), an uplink channel specifically created to support HSDPA. The HS-DPCCH physical channel is transmitted using a separate code-division multiplexing (CDM) channelization code, so that it may be transmitted simultaneously with other physical channels while remaining essentially invisible to base stations that do not support HSDPA.

Enabling and disabling a secondary carrier for DC-HSDPA may be communicated to the MSMS device through orders on a high speed shared control channel (HS-SCCH). During a tune-away from an active communication on a SIM utilizing HSDPA, any HS-SCCH order sent by the network may be missed. Typically, if there is no uplink response, the network will send up to three retransmissions of the HS-SCCH order. Once the HS-SCCH order is sent a total of four times, the first network may perform the indicated mode transition by enabling or disabling the secondary carrier. However, since the HS-SCCH order was not received by the MSMS device, a mismatch in downlink mode may be created that prevents the network from properly decoding feedback from the MSMS device on the high speed dedicated physical control channel (HS-DPCCH), causing the network to stop downlink data for the MSMS device.

For clarity, while the techniques and embodiments described herein relate to a wireless device configured with at least one WCDMA/UMTS SIM and/or GSM SIM, the embodiment techniques may be extended to subscriptions on other radio access networks (e.g., 1xRTT/CDMA2000, EVDO, LTE, WiMAX, Wi-Fi, etc.). In that regard, the messages, physical and transport channels, radio control states, etc. referred to herein may also be known by other terms in various radio access technologies and standards. Further, the messages, channels and control states may be associated with different timing in other radio access technologies and standards.

In various embodiments, an RF resource of a DSDS device may be configured to be shared between a plurality of SIMs, but may be employed by default to perform communications on a network enabled by a first SIM, such as a network capable of high-speed data communications (e.g., WCDMA, HSDPA, LTE, etc.). As such, a modem stack associated with a second SIM of the device may often be in idle mode with respect to a second network. Depending on the radio access technology of the second network, such idle mode states may involve implementing a power saving mode that includes a cycle of sleep and awake states. For example, if the second network is a GSM network, during idle mode the modem stack associated with the second SIM may implement discontinuous reception (DRX).

Specifically, during a wake-up period (i.e., awake state), the timing of which may be set by the second network for a paging group to which the second SIM belongs. The modem stack associated with the second SIM may attempt to use the shared RF resource to monitor a paging channel of the second network for paging requests. During the sleep state, the modem stack may power off most processes and components, including the associated RF resource.

Various embodiments may be implemented within a variety of communication systems, such as the example communication system 100 illustrated in FIG. 1. The communication system 100 may include one or more wireless devices 102, a telephone network 104, and network servers 106 coupled to the telephone network 104 and to the Internet 108. In some embodiments, the network server 106 may be implemented as a server within the network infrastructure of the telephone network 104.

A typical telephone network 104 includes a plurality of cell base stations 110 coupled to a network operations center 112, which operates to connect voice and data calls between the wireless devices 102 (e.g., tablets, laptops, cellular phones, etc.) and other network destinations, such as via telephone land lines (e.g., a plain old telephone system (POTS) network, not shown) and the Internet 108. The telephone network 104 may also include one or more servers 116 coupled to or within the network operations center 112 that provide a connection to the Internet 108 and/or to the network servers 106. Communications between the wireless devices 102 and the telephone network 104 may be accomplished via two-way wireless communication links 114, such as GSM, UMTS, EDGE, 4G, 3G, CDMA, TDMA, LTE, and/or other communication technologies.

Figure 2:
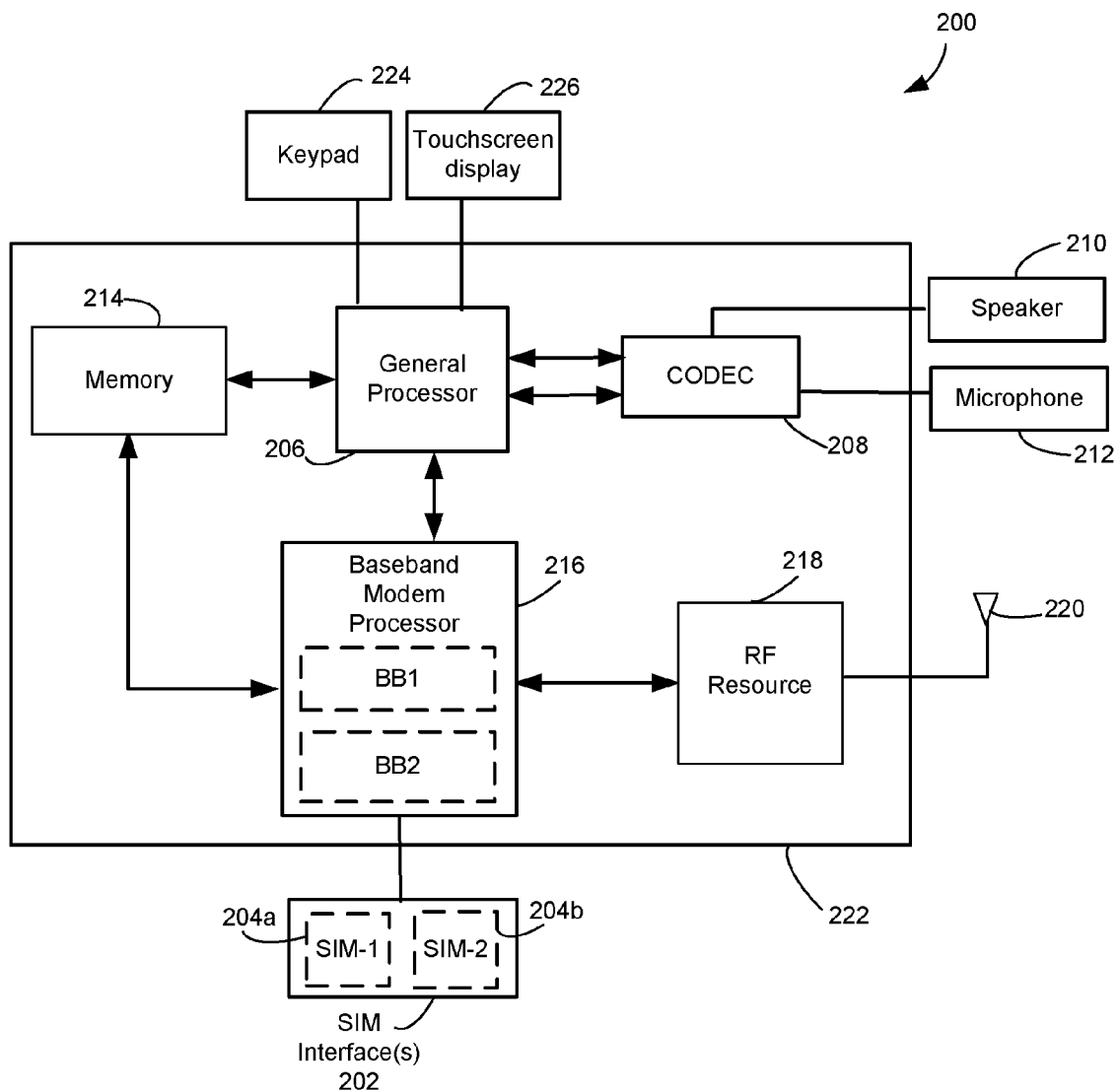
FIG. 2 is a block diagram illustrating a wireless communications device according to various embodiments.

FIG. 2 is a functional block diagram of an example wireless communication device 200 that is suitable for implementing various embodiments. According to various embodiments, the wireless device 200 may be similar to one or more of the wireless devices 102 described with reference to FIG. 1. With reference to FIGS. 1-2, in various embodiments, the wireless device 200 may be a single-SIM device, or a multi-SIM device, such as a dual-SIM device. In an example, the wireless device 200 may be a dual-SIM dual-standby (DSDS) device. The wireless device 200 may include at least one SIM interface 202, which may receive a first SIM (SIM-1) 204a that is associated with a first subscription. In some embodiments, the at least one SIM interface 202 may be implemented as multiple SIM interfaces 202, which may receive at least a second SIM (SIM-2) 204b that is associated with at least a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204a, 204b may have a CPU, ROM, RAM, EEPROM and I/O circuits. One or more of the first SIM 204a and second SIM 204b used in various embodiments may contain user account information, an IMSI a set of SIM application toolkit (SAT) commands and storage space for phone book contacts. One or more of the first SIM 204a and second SIM 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on one or more SIM 204 for identification.

The wireless device 200 may include at least one controller, such as a general-purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to a subscription though a corresponding baseband-RF resource chain. The memory 214 may store operating system (OS), as well as user application software and executable instructions.

The general purpose processor 206 and memory 214 may each be coupled to at least one baseband-modem processor 216. Each SIM 204a, 204b in the wireless device 200 may be associated with a baseband-RF resource chain that includes at least one baseband-modem processor 216 and at least one RF resource 218. In some embodiments, the wireless device 200 may be a DSDS device, with both SIMs 204a, 204b sharing a single baseband-RF resource chain that includes the baseband-modem processor 216 and RF resource 218. In some embodiments, the shared baseband-RF resource chain may include, for each of the first SIM 204a and the second SIM 204b, separate baseband-modem processor 216 functionality (e.g., BB1 and BB2). The RF resource 218 may be coupled to at least one antenna 220, and may perform transmit/receive functions for the wireless services associated with each SIM 204a, 204b of the wireless device 200. The RF resource 218 may implement separate transmit and receive functionalities, or may include a transceiver that combines transmitter and receiver functions.

In particular embodiments, the general purpose processor 206, memory 214, baseband-modem processor 216, and RF resource 218 may be included in a system-on-chip device 222. The first and second SIMs 204a, 204b and their corresponding interface(s) 202 may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

Figure 3:
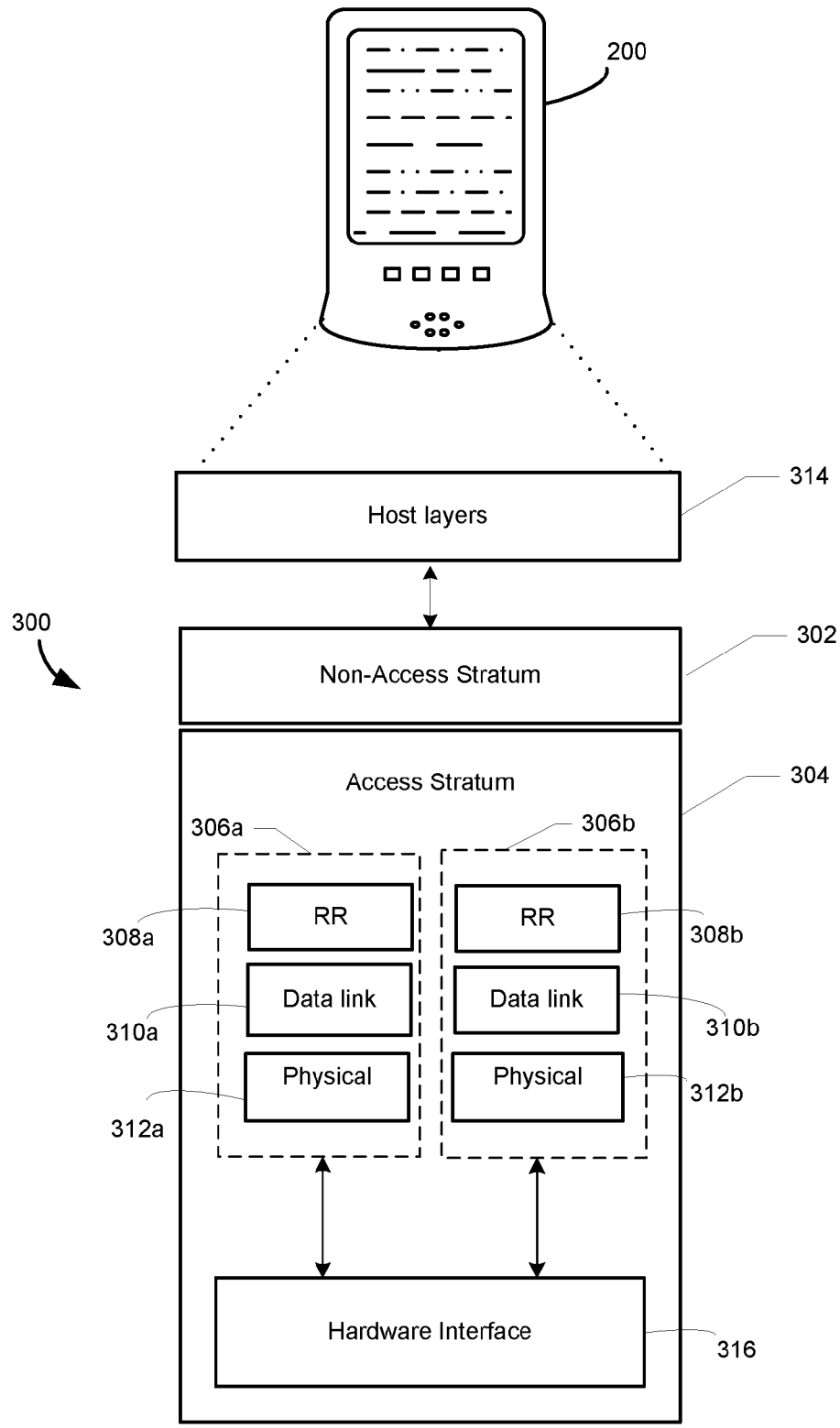
FIG. 3 is a system architecture diagram illustrating example protocol layer stacks implemented by the wireless communication device of FIG. 2.

Referring to FIGS. 1-3, wireless device 200 may have a layered software architecture 300 to communicate over access networks associated with SIMs. The software architecture 300 may be distributed among one or more processors, such as baseband-modem processor 216. The software architecture 300 may also include a Non Access Stratum (NAS) 302 and an Access Stratum (AS) 304. The NAS 302 may include functions and protocols to support traffic and signaling between SIMs of the wireless device 200 (e.g., first SIM/SIM-1 204a, second SIM/SIM-2 204b) and their respective core networks. The AS 304 may include functions and protocols that support communication between the SIMs (e.g., first SIM 204a, second SIM 204b) and entities of their respective access networks (such as a mobile switching center (MSC) if in a GSM network).

In the multi-SIM wireless communication device 200, the AS 304 may include multiple protocol stacks, each of which may be associated with a different SIM. For example, the AS 304 may include protocol stacks 306a, 306b, associated with the first and second SIMs 204a, 204b, respectively. Although described below with reference to GSM-type communication layers, protocol stacks 306a, 306b may support any of variety of standards and protocols for wireless communications.

Each protocol stack 306a, 306b may respectively include Radio Resource management (RR) layers 308a, 308b. The RR layers 308a, 308b may be part of Layer 3 of a GSM signaling protocol, and may oversee the establishment of a link between the wireless device 200 and associated access networks. In the various embodiments, the NAS 302 and RR layers 308a, 308b may perform the various functions to search for wireless networks and to establish, maintain and terminate calls.

In some embodiments, each RR layer 308a, 308b may be one of a number of sub-layers of Layer 3. Other sub-layers may include, for example, connection management (CM) sub-layers (not shown) that route calls, select a service type, prioritize data, perform QoS functions, etc.

Residing below the RR layers 308a, 308b, the protocol stacks 306a, 306b may also include data link layers 310a, 310b, which may be part of Layer 2 in a GSM signaling protocol. The data link layers 310a, 310b may provide functions to handle incoming and outgoing data across the network, such as dividing output data into data frames and analyzing incoming data to ensure the data has been successfully received. In some embodiments, each data link layer 310a, 310b may contain various sub-layers (e.g., media access control (MAC) and logical link control (LLC) layers (not shown)). Residing below the data link layers 310a, 310b, the protocol stacks 306a, 306b may also include physical layers 312a, 312b, which may establish connections over the air interface and manage network resources for the wireless device 200.

While the protocol stacks 306a, 306b provide functions to transmit data through physical media, the software architecture 300 may further include at least one host layer 314 to provide data transfer services to various applications in the wireless device 200. In some embodiments, application-specific functions provided by the at least one host layer 314 may provide an interface between the protocol stacks 306a, 306b and the general processor 206. In alternative embodiments, the protocol stacks 306a, 306b may each include one or more higher logical layers (e.g., transport, session, presentation, application, etc.) that provide host layer functions. In some embodiments, the software architecture 300 may further include in the AS 304 a hardware interface 316 between the physical layers 312a, 312b and the communication hardware (e.g., one or more RF resource).

In various embodiments, the protocol stacks 306a, 306b of the layered software architecture may be implemented to allow modem operation using information provisioned on multiple SIMs. Therefore, a protocol stack that may be executed by a baseband-modem processor is interchangeably referred to herein as a modem stack.

Although described below with reference to UNITS-type and GSM-type communication layers, the modem stacks in various embodiments may support any of a variety of current and/or future protocols for wireless communications. For examples, the modem stacks in various embodiments may support networks using other radio access technologies described in 3GPP standards (e.g., Long Term Evolution (LTE), etc.), 3GPP2 standards (e.g., 1xRTT/CDMA2000, Evolved Data Optimized (EVDO), Ultra Mobile Broadband (UMB), etc.) and/or Institute of Electrical and Electronics Engineers (IEEE) standards Worldwide Interoperability for Microwave Access (WiMAX), Wi-Fi, etc.).

As discussed, in a DSDS device in which the SIMs are configured to implement discontinuous reception (DRX), the RF resource is typically used to support both SIMs when both are in idle mode, but one SIM at a time when at least one SIM transitions out of idle mode. Conventionally, the DSDS device will still monitor system information from, and maintain a connection with, the serving network of the second SIM That is, the RF resource periodically tunes away from communication on the first SIM in order to decode a paging channel associated with the second SIM.

Figure 4:
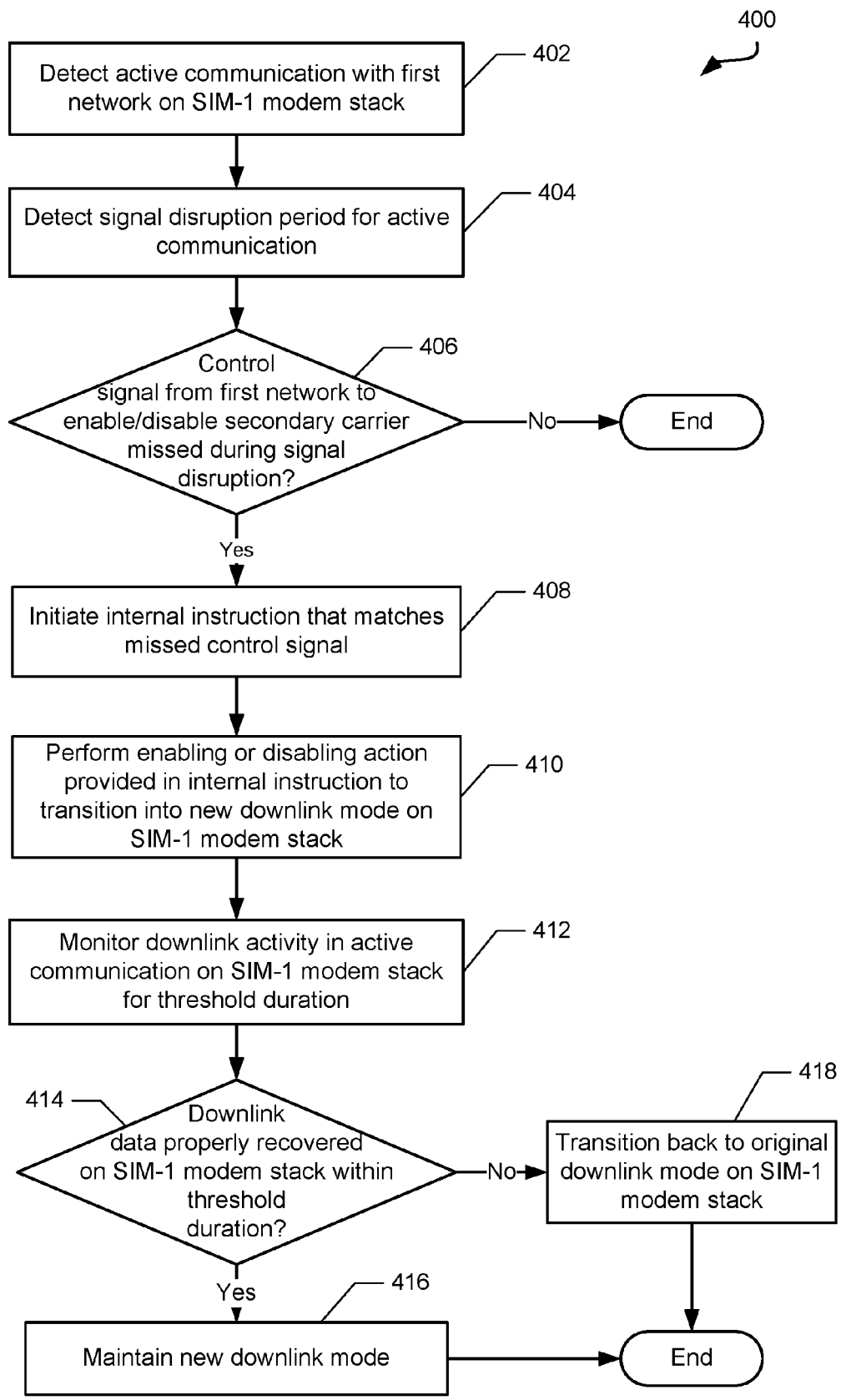
FIG. 4 is a process flow diagram illustrating a method for implementing downlink mode management on a wireless communication device according to various embodiments.

FIG. 4 illustrates a method 400 for managing synchronization between a downlink mode associated with a first SIM on a wireless device, and a corresponding downlink mode represented in a network, according to various embodiments. Specifically, such management may maintain an existing communication on the first SIM by avoiding the need for performing a cell update following signal disruption, such as a tune-away to a network associated with another SIM.

With reference to FIGS. 1-4, the wireless device may be a single-SIM or multi-SIM wireless communication device that is configured with a single shared RF resource (e.g., 218). In various embodiments, the operations of the method 400 may be implemented by one or more processors of the wireless device, such as a general purpose processor (e.g., 206) and/or baseband-modem processor (e.g., 216), or a separate controller (not shown) that may be coupled to memory (e.g., 214) and to a baseband-modem processor.

In block 402, the wireless device processor may detect that a modem stack associated with a first SIM ("SIM-1") is participating in an active communication on a first network that supports DC-HSDPA. In some embodiments, the active communication may involve sending data to the first network on a single uplink carrier, and/or receiving data from the first network on up to two adjacent downlink carriers, depending on a current downlink mode associated with the first SIM.

In block 404, the wireless device processor may detect a signal disruption period in the active communication on the first network. In some embodiments, the wireless device may be a multi-SIM wireless communication device operating in a MSMS mode, and the signal disruption period may be a tune-away gap for a second network supported by a second SIM. That is, in some embodiments the tune-away gap may be a short period in which the shared RF resource (e.g., 218) tunes away from the first network to the second network, and subsequently tunes back to the first network. In some embodiments, the modem stack associated with the second SIM may be camped in idle mode on the second network supported by the second SIM. As described, the tune-away to the second network may be used to monitor a paging channel in a timeslot assigned to a paging group of the second SIM, and may be performed periodically according to a DRX cycle established by the second network.

In some embodiments, the wireless device may be a single-SIM or a multi-SIM wireless communication device operating in a single-SIM mode. Various embodiments may be helpful to single SIM (or multi-SIM operating in single-SIM mode) wireless devices when a signal disruption occurs due to a temporary deep fade (i.e., strong destructive interference and drop in the signal-to-noise ratio) in the connection to the network. For example, when a single SIM (or multi-SIM operating in single-SIM mode) wireless device goes into a prolonged deep fade, the same HS-SCCH Order can be missed. In such situations, there may not be a radio link (RL) failure to drop the call because RL Failure is a lengthy process (requiring approximately 5-6s); however, the signal disruption might be such that the wireless device misses all transmissions of HS-SCCH Order. In such a radio environment, the network may downgrade wireless device due to lack of data activity.

In determination block 406, the wireless device processor may determine whether a control signal from the first network to enable or disable a secondary carrier was missed during the signal disruption period. In various embodiments, a missed control signal may be part of an HS-SCCH order transmitted by the first network. In this manner, the wireless device processor may identify a potential loss of synchronization between the operational downlink mode on the first SIM and the corresponding downlink mode represented in the first network. In response to determining that a control signal from the first network to enable or disable a secondary carrier was not missed during the signal disruption period (i.e., determination block 406="No"), the wireless device processor may end the method 400.

In response to determining that a control signal from the first network to enable or disable a secondary carrier was missed during the signal disruption period gap (i.e., determination block 406="Yes"), the wireless device processor may initiate an internal instruction that matches the missed control signal in block 408. In various embodiments, the internal instruction (also referred to as "self-SCCH order") may instruct the modem stack associated with the first SIM to either enable or disable a secondary carrier.

In block 410, the wireless device processor may perform the enabling or disabling action provided in the internal instruction to transition into a new downlink mode on the modem stack associated with the first SIM. For example, an internal instruction that requires enabling a secondary carrier may cause a transition from the single carrier mode to the dual carrier mode on the modem stack associated with the first SIM, while an internal instruction that requires disabling the secondary carrier may cause a transition from the dual to the single carrier mode on the modem stack associated with the first SIM.

The wireless device processor may monitor, for a threshold duration, downlink activity in the active communication on the modem stack associated with the first SIM in Hock 412. In various embodiments, the threshold duration may be a threshold number of subframes. In some embodiments, a parameter defining a threshold number of subframes may be set based on system information received from the first network operator. In some embodiments, a threshold duration and/or number of subframes may be set, for example, by a system operator associated with the first SIM, by the wireless device manufacturer, by the user, etc.

In determination block 414, the wireless device processor may determine whether downlink data has been properly recovered on the modem stack associated with the first SIM within the threshold duration. In various embodiments, proper recovery may involve receiving and successfully decoding the downlink data. In various embodiments, the downlink data may be control protocol data units (PDUs) or user data PDUs that are received from the first network in the active communication. In various embodiments, proper recovery may involve receiving and successfully decoding the downlink data.

In response to determining that downlink data has been properly recovered on the modem stack associated with the first SIM within the threshold duration (i.e., determination block 414="Yes"), the wireless device processor may maintain the new downlink mode in block 416, and end the method 400. That is, the wireless device processor may assume synchronization between the operational downlink mode on the modem stack associated with the first SIM and the corresponding downlink mode represented for the first SIM in the first network.

In response to determining that downlink data has not been properly recovered on the modem stack associated with the first SIM within the threshold duration (i.e., determination block 414="No") the wireless device processor may transition back to the original downlink mode on the modem stack associated with the first SIM in block 418, and may end the method 400.

Figure 5A:
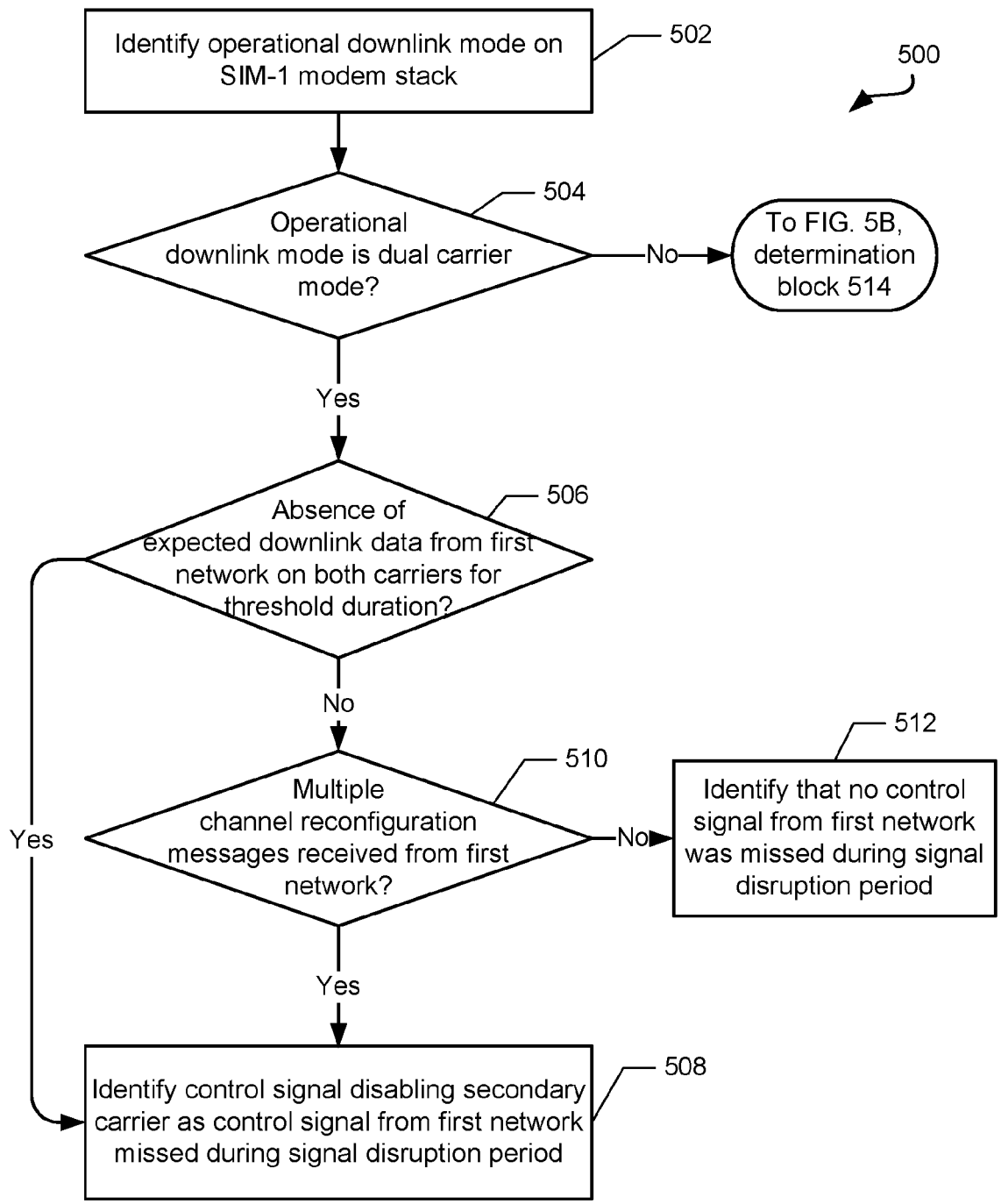
FIGS. 5A and 5B are process flow diagrams illustrating an embodiment method of determining whether a control signal was missed during a tune-away gap as implemented in FIG. 4 according to various embodiments.
Figure 5B:
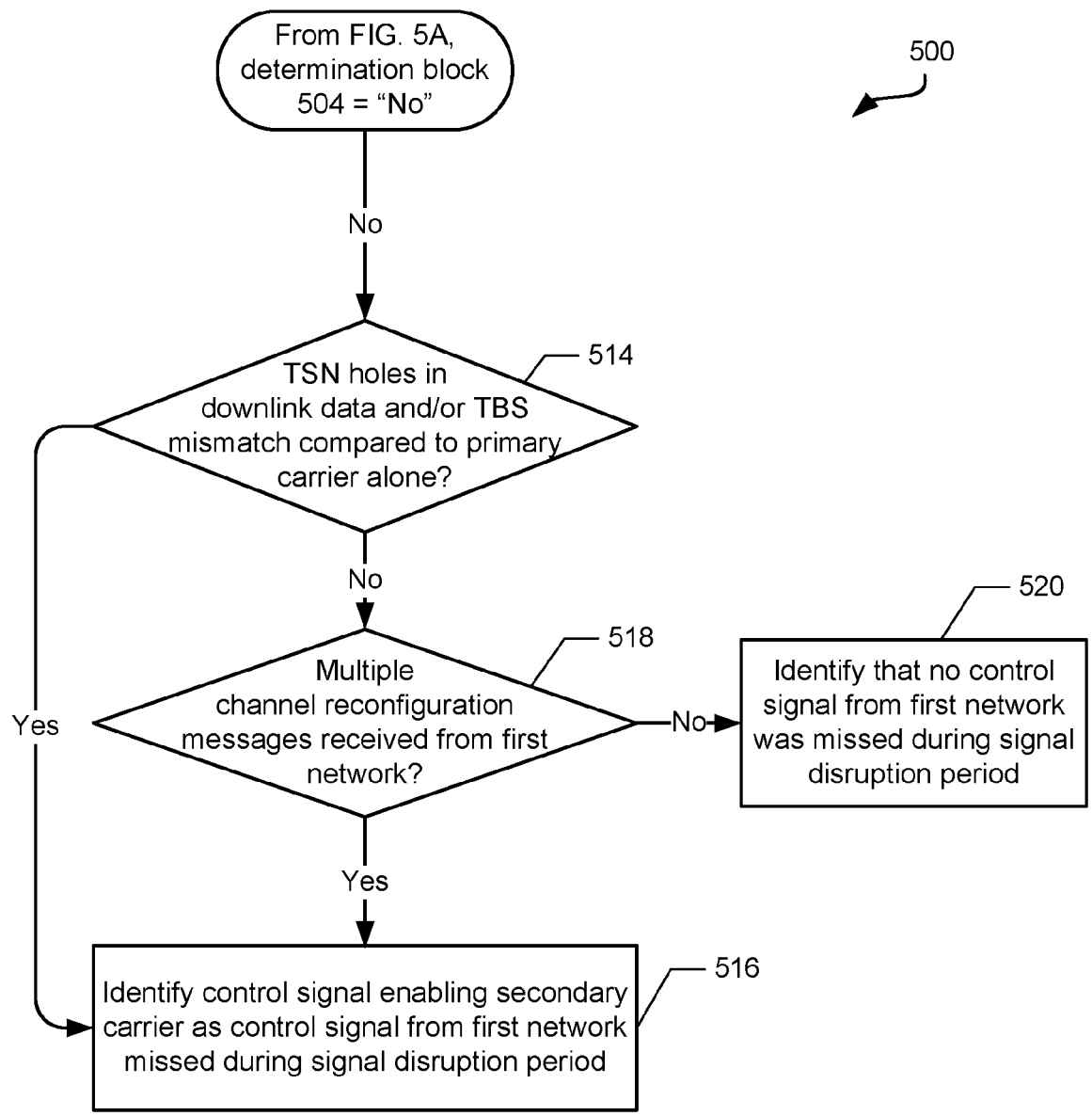

FIGS. 5A and 5B illustrate a method 500 for implementing determination block 406 of the method 400 (FIG. 4). That is, the method 500 may determine whether a control signal to enable or disable a secondary carrier from the first network was missed during the signal disruption period (i.e., tune-away gap or a temporary deep fade), and identify the missed control signal in order initiate an internal instruction that matches the missed control signal.

With reference to FIGS. 1-5B, the method 500 may be performed by the wireless device processor (e.g., the general processor 206, the baseband modem processor 216, a separate controller, and/or the like). In block 502, the wireless device processor may identify the current downlink mode on the modem stack associated with the first SIM. The wireless device processor may determine whether the identified current downlink mode is the dual carrier mode in determination block 504.

In response to determining that the identified current downlink mode is the dual carrier mode (i.e., determination block 504="Yes"), the wireless device processor may determine whether there is an absence of expected downlink data from the first network on both the primary and secondary carriers for a threshold duration in determination block 506. The absence of expected downlink data may be, for example, due to a lack of any downlink traffic PDUs, or may be specified as the absence of a downlink acknowledgment/non-acknowledgment (ACK/NACK) PDU for uplink data that was transmitted by the modem stack associated with the first SIM.

Similar to the threshold described in method 400 (FIG. 4), the threshold duration may be a threshold number of subframes. In some embodiments, a parameter defining a threshold number of subframes may be set based on system information received from the first network operator. In some embodiments, a threshold duration and/or number of subframes may be set, for example, by a system operator associated with the first SIM, by the wireless device manufacturer, by the user, etc.

Once the first network and the modem stack associated with the first SIM are out-of-sync with respect to the downlink mode, the first network may stop scheduling downlink user data, as well as downlink ACK/NACK PDUs for uplink data sent by the modem stack associated with the first SIM. Such network behavior may be due to the differences in encoding for the HS-DPCCH, depending on whether a single carrier or dual carrier mode is being used. Specifically, the modem stack associated with the first SIM may transmit a single HS-DPCCH to the first network, which carries one ACK/NACK bit if the modem stack associated with the first SIM is operating in the single carrier mode (corresponding to the one HS-PDSCH transmission that the modem stack associated with the first SIM attempts to decode), and one CQI report for the primary carrier. However, the single HS-DPCCH carries two ACK/NACK bits if the modem stack associated with the first SIM is operating in the dual carrier mode (corresponding to the two HS-PDSCH transmissions that the modem stack associated with the first SIM attempts to decode), and two CQI reports (one each for the primary and secondary carriers).

Therefore, if the downlink mode for the first SIM represented in the first network does not match the operational downlink mode, the first network may be unable to decode the HS-DPCCH due to the mismatched encoding. As a result, the network may stop scheduling downlink data (i.e., HS-PDSCH).

In response to determining that there is an absence of expected downlink data from the first network on both the primary and secondary carriers for a threshold duration (i.e., determination block 506="Yes"), the wireless device processor may identify an control signal disabling the secondary carrier as being a control signal from the first network that was missed during the signal disruption period in block 508.

In response to determining that there is no absence of expected downlink data from the first network on both the primary and secondary carriers for the threshold duration (i.e., determination block 506="No"), the wireless device processor may determine whether multiple channel reconfiguration messages are received from the first network in determination block 510. In various embodiments, upon being unable to decode the HS-DPCCH properly the first network may attempt to adjust parameters in a manner that increases favorable conditions for receiving the information. For example, the first network may send a channel reconfiguration message to the modem stack associated with the first SIM that requests retransmission of the ACK/NACK information, requests transmission at a higher power, etc.

In response to determining that multiple channel reconfiguration messages were received from the first network (i.e., determination block 510="Yes"), the wireless device processor may proceed to block 508 to identify a control signal disabling the secondary carrier as being a control signal from the first network that was missed during the signal disruption period.

In response to determining that multiple channel reconfiguration messages were not received from the first network (i.e., determination block 510="No"), the wireless device processor may identify that no control signal from first network was missed during the signal disruption period in block 512.

In response to determining that the operational downlink mode is not the dual carrier mode (i.e., determination block 504="No"), the wireless device processor may determine whether transmission sequence number (TSN) holes in downlink data are detected compared to the scheduling on the primary carrier and/or transport block size (TBS) from the network does not match CQI reported on the primary carrier in determination block 514. For example, when the modem stack associated with the first SIM is only monitoring the HS-PDSCH for the primary carrier, if data is instead scheduled by the first network across both the primary and secondary carriers, portions of such data may be missed, and will not match the scheduling information for the primary carrier alone. Also, CQI reported to the first network using only the primary carrier may not match up with the TBS for downlink data that is scheduled across both the primary and secondary carriers.

In response to determining that TSN holes in downlink data are detected compared to the scheduling on the primary carrier and/or TBS from the network does not match CQI reported on the primary carrier (i.e., determination block 514="Yes"), the wireless device processor may identify a control signal disabling the secondary carrier as being a control signal from first network that was missed during the signal disruption period in block 516.

In response to determining that transmission sequence number (TSN) holes in downlink data are not detected compared to the scheduling on the primary carrier and transport block size (TBS) from the network matches CQI reported on the primary carrier (i.e., determination block 514="No"), the wireless device processor may determine whether multiple channel reconfiguration messages are received from the first network in determination block 518 in a manner similar to determination block 510 (FIG. 5A).

In response to determining that multiple channel reconfiguration messages were received from the first network (i.e., determination block 518="Yes"), the wireless device processor may return to block 516 to identify a control signal enabling the secondary carrier as being a control signal from the first network that was missed during the signal disruption period.

In response to determining that multiple channel reconfiguration messages were not received from the first network (i.e., determination block 518="No"), in the same manner as block 512 (FIG. 5A), the wireless device processor may identify that no control signal from first network was missed during the signal disruption period in block 520.

Figure 6:
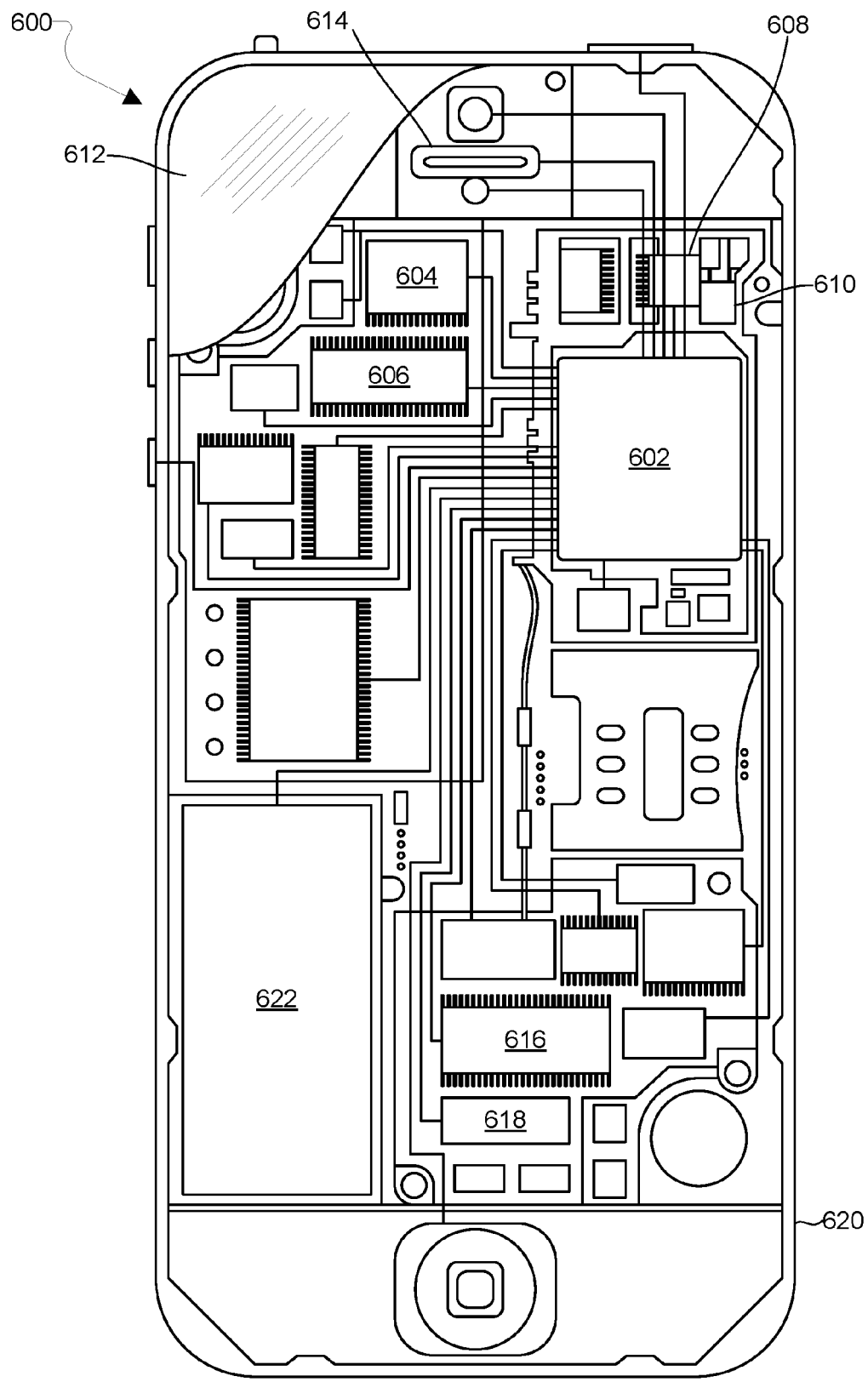
FIG. 6 is a component diagram of an example wireless communication device suitable for use with various embodiments.

Various embodiments may be implemented in any of a variety of wireless devices, an example of which is illustrated in FIG. 6. For example, With reference to FIGS. 1-6, a wireless device 600 (which may correspond, for example, the wireless devices 102,200 in FIGS. 1-2) may include a processor 602 coupled to a touchscreen controller 604 and an internal memory 606. The processor 602 may be one or more multicore integrated circuits (ICs) designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The transceivers 608 and antennae 610 may be used with the above-mentioned circuitry to implement the various wireless transmission protocol stacks and interfaces. The wireless device 600 may include a cellular network wireless modem chip 616 that enables communication via a cellular network and is coupled to the processor. The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

Figure 7:
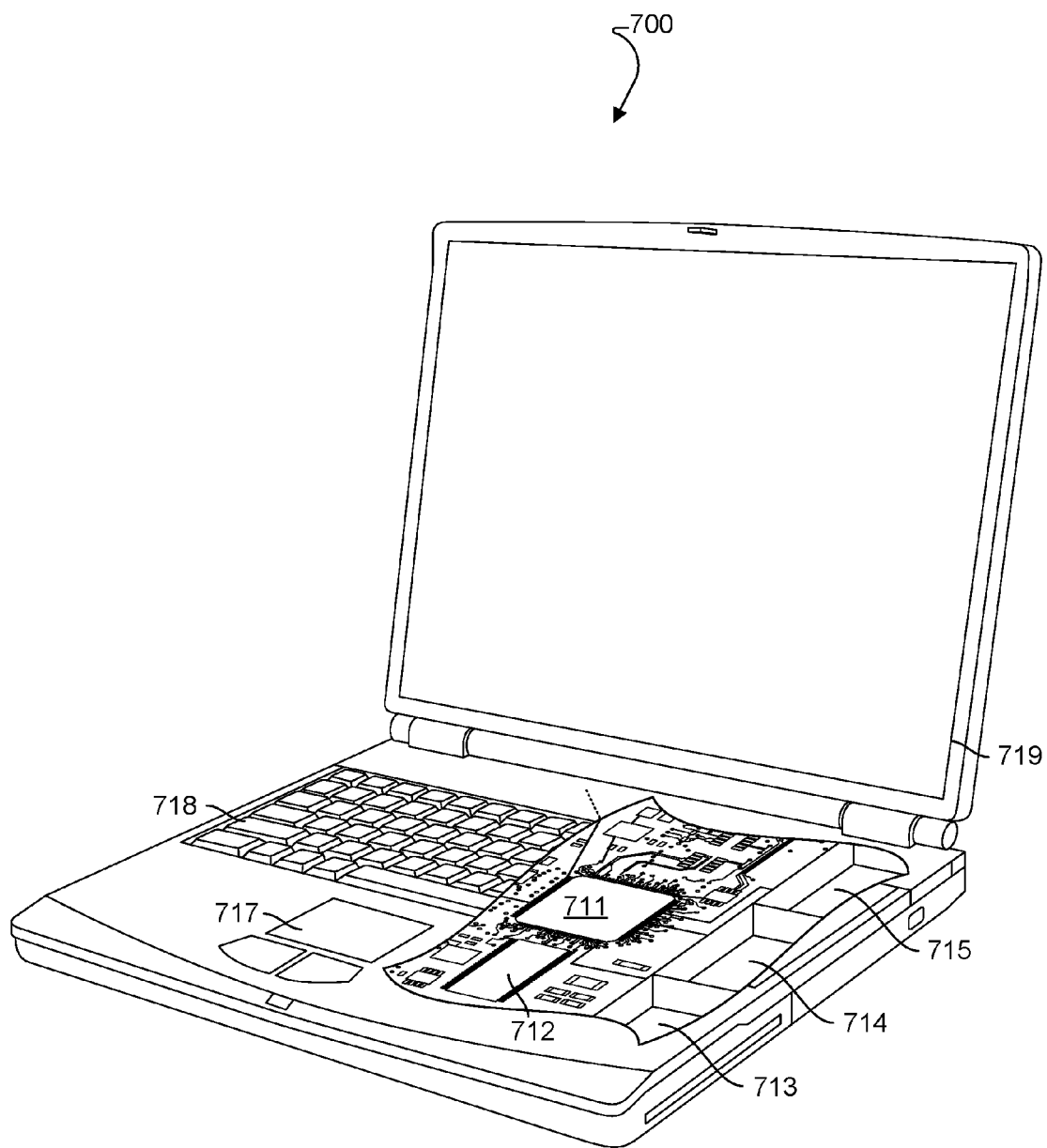
FIG. 7 is a component diagram of another example wireless communication device suitable for use with various embodiments.

With reference to FIGS. 1-7, various embodiments described herein may also be implemented within a variety of personal computing devices, such as a laptop computer 700 (which may correspond, for example, the wireless devices 102, 200) as illustrated in FIG. 7. Many laptop computers include a touchpad touch surface 717 that serves as the computer's pointing device, and thus may receive drag, scroll, and flick gestures similar to those implemented on wireless computing devices equipped with a touch screen display and described above. The laptop computer 700 will typically include a processor 711 coupled to volatile memory 712 and a large capacity nonvolatile memory, such as a disk drive 713 of Flash memory. The laptop computer 700 may also include a floppy disc drive 714 and a compact disc (CD) drive 715 coupled to the processor 711. The laptop computer 700 may also include a number of connector ports coupled to the processor 711 for establishing data connections or receiving external memory devices, such as a Universal Serial Bus (USB) or FireWire® connector sockets, or other network connection circuits for coupling the processor 711 to a network. In a notebook configuration, the computer housing includes the touchpad touch surface 717, the keyboard 718, and the display 719 all coupled to the processor 711. Other configurations of the computing device may include a computer mouse or trackball coupled to the processor (e.g., via a USB input) as are well known, which may also be used in conjunction with various embodiments.

The processors 602 and 711 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 606, 712 and 713 before they are accessed and loaded into the processors 602 and 711. The processors 602 and 711 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 602, 711, including internal memory or removable memory plugged into the device and memory within the processor 602 and 711, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, or carrier.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiment, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of improving performance of a wireless communication device having at least a first SIM and a radio frequency (RF) resource, the method comprising:
   detecting an active communication in a first network on a modem stack associated with the first SIM;
   detecting a signal disruption period during the active communication in the first network;
   determining whether an operational downlink mode for the modem stack does not match a corresponding downlink mode represented in the first network; and
   triggering an internal instruction to transition to a new downlink mode in response to determining that the operational downlink mode for the modem stack does not match a corresponding downlink mode represented in the first network.

2. The method of claim 1, wherein determining whether an operational downlink mode for the modem stack associated does not match a corresponding downlink mode represented in the first network comprises:
   determining whether a control signal for transitioning to a new downlink mode was missed on the modem stack during the signal disruption period.

3. The method of claim 2, wherein the control signal for transitioning to the new downlink mode comprises an instruction to transition to a dual carrier mode by enabling a secondary carrier.

4. The method of claim 2, wherein the control signal for transitioning to the new downlink mode comprises an instruction to transition to a single carrier mode by disabling a secondary carrier.

5. The method of claim 1, wherein determining whether an operational downlink mode for the modem stack does not match a corresponding downlink mode represented in the first network is based on an absence of expected downlink data from the first network.

6. The method of claim 5, wherein the absence of expected downlink data comprises a lack of any downlink traffic protocol data units (PDUs) from the first network.

7. The method of claim 5, wherein the absence of expected downlink data comprises an absence of a downlink acknowledgment/non-acknowledgment (ACK/NACK) protocol data unit (PDU) corresponding to a previous uplink data transmission to the first network.

8. The method of claim 1, wherein determining whether an operational downlink mode for the modem stack does not match a corresponding downlink mode represented in the first network is based on at least one of:
   detected transmission sequence number (TSN) holes in downlink data received from the first network; and
   disproportionate transport block size (TBS) in downlink data received from the first network compared to a channel quality indicator (CQI) reported to the first network.

9. The method of claim 1, further comprising:
   monitoring downlink data received on the modem stack after the transition to the new downlink mode; and
   transitioning back to an original downlink mode in response to a continued absence of expected downlink data.

10. The method of claim 1, wherein the wireless communication device has at least a second SIM associated with the RF resource, and
   wherein detecting the signal disruption period during the active communication in the first network comprises detecting a tune-away by the RF resource from the first network to a second network associated with the second SIM, wherein the RF resource tunes back to the first network after the tune-away.

11. The method of claim 1, wherein detecting the signal disruption period during the active communication in the first network comprises detecting a temporary deep fade on a channel associated with connecting to the first network.

12. The method of claim 1, wherein the first network supports high speed downlink packet access (HSDPA).

13. A wireless communication device, comprising:
a radio frequency (RF) resource configured to connect to at least a first subscriber identity module (SIM); and
a processor coupled to the RF resource and configured with processor-executable instructions to:
detect an active communication in a first network on a modem stack associated with the first SIM;
detect a signal disruption period during the active communication in the first network;
determine whether an operational downlink mode for the modem stack does not match a corresponding downlink mode represented in the first network; and
trigger an internal instruction to transition to a new downlink mode in response to determining that the operational downlink mode for the modem stack does not match a corresponding downlink mode represented in the first network.

14. The wireless communication device of claim 13, wherein the processor is further configured with processor-executable instructions to determine whether an operational downlink mode for the modem stack does not match a corresponding downlink mode represented in the first network by:
determining whether a control signal for transitioning to a new downlink mode was missed on the modem stack during the signal disruption period.

15. The wireless communication device of claim 14, wherein the control signal for transitioning to the new downlink mode comprises an instruction to transition to a dual carrier mode by enabling a secondary carrier.

16. The wireless communication device of claim 14, wherein the control signal for transitioning to the new downlink mode comprises an instruction to transition to a single carrier mode by disabling a secondary carrier.

17. The wireless communication device of claim 13, wherein the processor is further configured with processor-executable instructions to determine whether an operational downlink mode for the modem stack does not match a corresponding downlink mode represented in the first network based on an absence of expected downlink data from the first network.

18. The wireless communication device of claim 17, wherein the absence of expected downlink data comprises a lack of any downlink traffic protocol data units (PDUs) from the first network.

19. The wireless communication device of claim 17, wherein the absence of expected downlink data comprises an absence of a downlink acknowledgment/non-acknowledgment (ACK/NACK) protocol data unit (PDU) corresponding to a previous uplink data transmission to the first network.

20. The wireless communication device of claim 13, wherein the processor is further configured with processor-executable instructions to determine whether an operational downlink mode for the modem stack does not match a corresponding downlink mode represented in the first network based on at least one of:
detected transmission sequence number (TSN) holes in downlink data received from the first network; and
a disproportionate transport block size (TBS) in downlink data received from the first network compared to a channel quality indicator (CQI) reported to the first network.

21. The wireless communication device of claim 13, wherein the processor is further configured with processor-executable instructions to:
monitor downlink data received on the modem stack after the transition to the new downlink mode; and
transition back to an original downlink mode in response to a continued absence of expected downlink data.

22. The wireless communication device of claim 13, further comprising at least a second SIM associated with the RF resource, wherein the processor is further configured with processor-executable instructions to detect the signal disruption period during the active communication in the first network by:
detecting a tune-away by the RF resource from the first network to a second network associated with the second SIM, wherein the RF resource tunes back to the first network after the tune-away.

23. The wireless communication device of claim 13, wherein the processor is further configured with processor-executable instructions to detect the signal disruption period during the active communication in the first network by detecting a temporary deep fade on a channel associated with connecting to the first network.

24. The wireless communication device of claim 13, wherein the first network supports high speed downlink packet access (HSDPA).

25. A wireless communication device, comprising:
a radio frequency resource;
means for detecting an active communication in a first network on a modem stack associated with a subscriber identity module (SIM);
means for detecting a signal disruption period during the active communication in the first network;
means for determining whether an operational downlink mode for the modem stack does not match a corresponding downlink mode represented in the first network; and
means for triggering an internal instruction to transition to a new downlink mode in response to determining that the operational downlink mode for the modem stack does not match a corresponding downlink mode represented in the first network.

26. A non-transitory processor-readable storage medium having stored thereon processor-executable instructions configured to cause a processor of a wireless communication device having a radio frequency (RF) resource configured to connect to at least a first subscriber identity module (SIM) to perform operations comprising:
detecting an active communication in a first network on a modem stack associated with the first SIM;
detecting a signal disruption period during the active communication in the first network;
determining whether an operational downlink mode for the modem stack does not match a corresponding downlink mode represented in the first network; and
triggering an internal instruction to transition to a new downlink mode in response to determining that the operational downlink mode for the modem stack does not match a corresponding downlink mode represented in the first network.

27. The non-transitory processor-readable storage medium of claim 26, wherein the stored processor-executable instructions are configured to cause the processor of the wireless communication device to perform operations such that determining whether an operational downlink mode for the modem stack does not match a corresponding downlink mode represented in the first network comprises:
determining whether a control signal for transitioning to a new downlink mode was missed on the modem stack during the signal disruption period.

28. The non-transitory processor-readable storage medium of claim 27, wherein the stored processor-executable instructions are configured to cause the processor of the wireless communication device to perform operations such that the control signal for transitioning to the new downlink mode comprises an instruction to transition to a dual carrier mode by enabling a secondary carrier.

29. The non-transitory processor-readable storage medium of claim 27, wherein the stored processor-executable instructions are configured to cause the processor of the wireless communication device to perform operations such that the control signal for transitioning to the new downlink mode comprises an instruction to transition to a single carrier mode by disabling a secondary carrier.

30. The non-transitory processor-readable storage medium of claim 26, wherein the stored processor-executable instructions are configured to cause the processor of the wireless communication device to perform operations such that determining whether an operational downlink mode for the modem stack does not match a corresponding downlink mode represented in the first network is based on an absence of expected downlink data from the first network.

* * * * *